US012565607B2

(12) United States Patent
Takei et al.

(10) Patent No.:　US 12,565,607 B2
(45) Date of Patent:　*Mar. 3, 2026

(54) ANTIFOGGING COATING COMPOSITION, ANTIFOGGING COATING FILM, AND ANTIFOGGING ARTICLE

(71) Applicant: NEOS COMPANY LIMITED, Hyogo (JP)

(72) Inventors: Koki Takei, Konan (JP); Haruka Shigematsu, Konan (JP); Kentaro Nishii, Konan (JP)

(73) Assignee: NEOS COMPANY LIMITED, Kobe (JP)

( * ) Notice: Subject to any disclaimer, the term of this patent is extended or adjusted under 35 U.S.C. 154(b) by 842 days.

This patent is subject to a terminal disclaimer.

(21) Appl. No.: 17/789,328

(22) PCT Filed: Dec. 24, 2020

(86) PCT No.: PCT/JP2020/048372

§ 371 (c)(1),
(2) Date: Jun. 27, 2022

(87) PCT Pub. No.: WO2021/140931

PCT Pub. Date: Jul. 15, 2021

(65) Prior Publication Data

US 2023/0137628 A1　　May 4, 2023

(30) Foreign Application Priority Data

Jan. 10, 2020　(JP) ................................. 2020-003244
Jun. 15, 2020　(JP) ................................. 2020-102957

(51) Int. Cl.
*C09K 3/18*　　　　(2006.01)

(52) U.S. Cl.
CPC ..................................... *C09K 3/18* (2013.01)

(58) Field of Classification Search
CPC .... B32B 9/00; C09D 1/00; C09D 7/61; C09D 7/63; C09K 3/18
See application file for complete search history.

(56) References Cited

U.S. PATENT DOCUMENTS

| | | | |
|---|---|---|---|
| 2019/0100674 A1 | 4/2019 | Hama et al. | |
| 2019/0263986 A1* | 8/2019 | Nakamichi | .............. C09D 7/40 |
| 2019/0264065 A1 | 8/2019 | Koito et al. | |

FOREIGN PATENT DOCUMENTS

| | | | |
|---|---|---|---|
| CN | 109937141 A | | 6/2019 |
| EP | 3527368 A1 | | 8/2019 |
| JP | 2003192472 A | * | 7/2003 |
| JP | 2003-253242 A | | 9/2003 |
| JP | 2005-126647 A | | 5/2005 |
| JP | 2016-169287 A | | 9/2016 |
| JP | 2019-019253 A | | 2/2019 |
| JP | 2019-065178 A | | 4/2019 |
| WO | 2016/153050 A1 | | 9/2016 |
| WO | 2018/092544 A1 | | 5/2018 |

OTHER PUBLICATIONS

International Search Report for International Application No. PCT/JP2020/048372 dated Mar. 23, 2021, Japan, 3 pages.

* cited by examiner

*Primary Examiner* — Anthony J Green
(74) *Attorney, Agent, or Firm* — United IP Counselors, LLC

(57) ABSTRACT

The present invention provides an antifogging coating composition containing elongated colloidal silica and spheroidal colloidal silica. The purpose of the present invention is to provide an antifogging coating composition that can form an antifogging coating film that blushing does not occur even when water vapor is adhered thereto, and to provide an antifogging coating film that can exhibit an antifogging effect over a long period of time with almost no occurrence of changes in external appearance such as water drip marks.

11 Claims, 2 Drawing Sheets

ANTIFOGGING COATING COMPOSITION, ANTIFOGGING COATING FILM, AND ANTIFOGGING ARTICLE

CROSS-REFERENCE TO RELATED APPLICATIONS

This application is a National Stage Entry application of PCT International Application No. PCT/JP2020/048372, filed on Dec. 24, 2020, which claims the priority benefit of Japanese Patent Application No. 2020-003244, filed on Jan. 10, 2020, and Japanese Patent Application No. 2020-102957, filed on Jun. 15, 2020, the entire contents of all of which are hereby incorporated by reference.

BACKGROUND

1. Technical Field

The present invention relates to an antifogging coating composition, an antifogging coating film produced using the same, and an antifogging article.

2. Description of the Background

An illumination device such as a headlight of an automobile mainly includes a light source and a transparent member formed of glass, plastic, or the like disposed in front of the light source. Light emitted from the light source is irradiated to the outside and the peripheral portion of the illumination device through the transparent member. In such an illumination device, fog may be generated on the inner side (light source side) of the transparent member, and the intensity of the irradiation light may decrease, resulting in a safety problem. In addition, the amount of light irradiated through the fogged transparent member is small, which may cause a problem in terms of beauty in appearance.

JP 2016-169287 A discloses an antifogging agent composition containing a copolymer (A), a polyfunctional blocked isocyanate compound (B), and a surfactant (C). The antifogging agent composition of JP 2016-169287 A utilizes a conventionally well-known antifogging mechanism. In this antifogging agent composition, the surfactant (C) present in the antifogging coating film to which the antifogging agent composition is applied reduces the surface tension of water attached to the antifogging coating film on the substrate, instantaneously forms a smooth water film, and prevents diffuse reflection of light to prevent fogging. Meanwhile, JP 2005-126647 A discloses an antifogging agent containing an aqueous medium, necklace-like colloidal silica, a silane derivative, and a surfactant. In JP 2005-126647 A, necklace-like colloidal silica having a pH of 8 to 11 (that is, alkaline) when dispersed in an aqueous medium is used. The antifogging agent in JP 2005-126647 A exerts an antifogging effect by coating, with colloidal silica, the surface of a substrate on which a coating film is formed. Furthermore, JP 2019-19253 A proposes an antifogging coating composition containing acidic elongated colloidal silica and elongated colloidal silica for pH adjustment, which exhibits an antifogging effect for a long period of time without causing a change in appearance such as a trace of water trickling down.

BRIEF SUMMARY

When a water film is formed on an antifogging coating film formed from an antifogging agent composition containing a surfactant disclosed in JP 2016-169287 A as a main component, the surfactant dissolves in water, and the surfactant and water may flow together locally. When such a portion is dried, a trace of water trickling down may remain on an antifogging article. In addition, when colloidal silica exhibiting strong alkalinity in an aqueous medium is used as an antifogging agent as described in JP 2005-126647 A, although the reason is not clear, the colloidal silica covering the substrate may flow together with water, and a trace of water trickling down may remain on the antifogging article. The antifogging coating composition of JP 2019-19253 A can form an effective antifogging coating film having little change in appearance. However, a phenomenon of blushing on the coating film has occurred in some cases, in the process of drying of water vapor having adhered to the antifogging coating film in JP 2019-19253 A. Blushing of the coating film is temporary, and blushing is eliminated when the coating film is completely dried. However, there has been a slight difficulty in using the antifogging coating film for products in which the highest emphasis is placed on safety, such as automobile headlights and traffic lights.

As such, an object of the present invention is to provide an antifogging coating composition capable of forming an antifogging coating film in which blushing does not occur even when water vapor is adhered thereto, and an antifogging coating film capable of exhibiting an antifogging effect for a long period of time with rarely causing a change in appearance such as a trace of water trickling down.

The antifogging coating composition in an embodiment of the present invention comprises elongated colloidal silica and spheroidal (ball-shaped) colloidal silica.

Another embodiment of the present invention is an antifogging coating film comprising elongated silica and spheroidal silica, in which the spheroidal silica is embedded in a void between adjacent ones of the elongated silica.

Still another embodiment of the present invention is an antifogging article including a substrate and the antifogging coating film of the other embodiment of the present invention.

An antifogging coating film formed using the antifogging coating composition of the present invention instantaneously forms a smooth water film to prevent diffuse reflection of light and is excellent in antifogging performance. The antifogging coating film of the present invention hardly causes a change in appearance, such as a trace of water trickling down after drying. In addition, the antifogging coating film according to the present invention hardly shows a blushing phenomenon associated with adhesion of water vapor, and can always maintain a transparent appearance. An antifogging article (for example, an illumination device) using the antifogging coating composition according to the present invention hardly causes a change in appearance, and can maintain a stable light amount for a long period of time.

DETAILED DESCRIPTION

Figure 1:
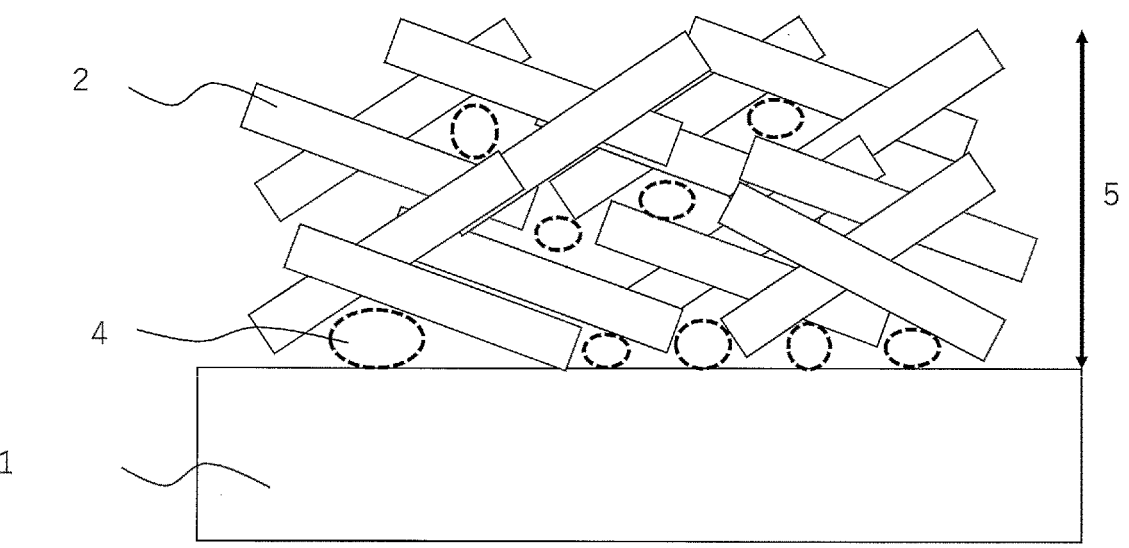
FIG. 1 is a schematic view illustrating a state of a coating film in which elongated silica is disposed on a surface of a substrate.

Embodiments of the present invention will be described below. An embodiment of the present invention is an anti-fogging coating composition comprising elongated colloidal silica and spheroidal colloidal silica.

In the present embodiment, the antifogging coating composition is a composition capable of forming a coating film on a substrate made of glass, plastic, or the like to make it difficult to generate fog due to water droplets caused by water vapor. When there is a temperature difference between both spaces separated by the substrate, moisture in the space having higher temperature condenses on the surface of the substrate to form water droplets. This water droplet causes diffuse reflection of light to generate fog. As a mechanism for preventing the formation of water droplets on a substrate, the following mechanisms have been known: one instantaneously converting moisture adhering to the surface of the substrate into a water film, and the other instantaneously absorbing moisture adhering to the surface of the substrate. In the antifogging coating composition according to the present embodiment, moisture adhering to the surface of the substrate is instantaneously converted into a water film to prevent formation of water droplets, thereby forming an antifogging coating film that prevents fogging of the substrate.

The antifogging coating composition according to the present embodiment comprises elongated colloidal silica. Colloidal silica is a colloidal solution (or dispersion) of silicon dioxide (silica, $SiO_2$) or a hydrate thereof. Depending on properties of a dispersion medium, there are aqueous colloidal silica and organic solvent-based organosilica sol. The silica particularly suitably used in the embodiments is colloidal silica. The primary particle diameter of the spheroidal silica forming the colloidal silica is usually about 10 to 300 nm, and the silica primary particles may form larger secondary particles by aggregation or the like. The colloidal silica suitably used in the present embodiment is elongated colloidal silica. The elongated colloidal silica is a colloidal solution (or dispersion) of elongated silica in which tens to tens of thousands of silica primary particles are covalently bonded to each other to form a long shape such as a string shape, a cylindrical shape, or a rod shape. As colloidal silica serving as a colloidal solution (or dispersion) of such elongated silica, chain-like colloidal silica and pearl neck-lace-like colloidal silica are known. The elongated colloidal silica can spread and adsorb to the surface of the substrate to form a coating film, and thus can be preferably used as a component of the antifogging coating film composition. Note that colloidal silica in which silica is dispersed in water as a dispersion medium includes acidic, neutral, and basic colloidal silica, depending on difference in the surface state of silica. Examples of the elongated colloidal silica suitably used in the present embodiment include acidic elongated colloidal silica exhibiting strong acidity at a pH of 1 to 3, neutral elongated colloidal silica exhibiting weak acidity to neutrality to weak alkalinity at a pH of 4 to 9, and basic elongated colloidal silica exhibiting a pH of 10 to 14. These can be used alone, or can be used by mixing them. When a plurality of types of colloidal silica is used by mixing them, they are preferably mixed such that the mixed colloidal silica has a neutral to weakly alkaline pH (about pH 7 to 10). The elongated colloidal silica suitably used as one component of the present embodiment is an elongated colloidal silica mixture obtained by mixing acidic elongated colloidal silica exhibiting strong acidity at pH 1 to 3 and basic colloidal silica. Examples of the elongated colloidal silica that can be used in the embodiments include commercially available products such as ST-OUP, ST-UP, ST-PS-S, ST-PS-M, ST-PS-SO, and ST-PS-MO (all available from Nissan Chemical Corporation).

When an elongated colloidal silica mixture obtained by mixing acidic elongated colloidal silica and basic elongated colloidal silica is used in the antifogging coating composition according to the embodiment, the basic elongated colloidal silica is used for raising the pH of the acidic elongated colloidal silica described above to adjust the pH to be weakly acidic to weakly alkaline. Acidic elongated colloidal silica is preferably used because it can form a coating film after the dispersion medium is evaporated, effectively form a water film, and exhibit an antifogging effect. However, when the acidity of the colloidal silica is too strong, the properties of the antifogging coating composition are not stabilized, and handling may be difficult. In addition, the strongly acidic antifogging coating composition may corrode a substrate to be applied (for example, a metal substrate or a predetermined plastic substrate), and may not be usable depending on the substrate to be applied. In view of this, the basic elongated colloidal silica is mixed to appropriately adjust the pH of the entire elongated colloidal silica. Note that various alkaline compounds such as an inorganic base and an organic base can be used for the purpose of adjusting the pH, but basic elongated colloidal silica whose pH is relatively easily adjusted is preferably used.

The acidic elongated colloidal silica and the basic elongated colloidal silica are preferably mixed such that the colloidal silica mixture has a neutral to weakly alkaline pH (pH of about 7 to 10). In order to make the pH of the colloidal silica mixture neutral or weakly alkaline, the acidic elongated colloidal silica and the basic elongated colloidal silica are preferably mixed such that the solid content weight ratio between the acidic elongated colloidal silica and the basic elongated colloidal silica is 2.5:10 to 90:10. The solid content weight ratio is a ratio of a weight of a solid content substantially occupied in each colloidal silica. As described above, the acidic elongated colloidal silica and the basic elongated colloidal silica are particularly preferably mixed such that the mixture has a neutral to weakly alkaline pH (pH of about 7 to 10), but the pH can also be adjusted by further mixing spheroidal colloidal silica to be described later.

The antifogging coating composition according to the embodiment further comprises spheroidal colloidal silica. Like the above-described elongated colloidal silica, the spheroidal colloidal silica is also a colloidal solution (or dispersion) of silicon dioxide (Silica, $SiO_2$) or a hydrate thereof. The primary particle diameter of silica is usually about 10 to 300 nm, and the silica primary particles may form larger secondary particles by aggregation or the like. However, the size of the spheroidal colloidal silica used in the embodiments is preferably about 100 nm at the largest. The spheroidal colloidal silica has a substantially spherical particle shape in water. As described above, colloidal silica in which silica is dispersed in water as a dispersion medium includes acidic, neutral, and basic colloidal silica, depending on difference in the surface state of silica. Examples of the spheroidal colloidal silica suitably used in the present embodiment include acidic spheroidal colloidal silica exhibiting strong acidity at a pH of 1 to 3, neutral spheroidal colloidal silica exhibiting weak acidity to neutrality to weak alkalinity at a pH of 4 to 9, and basic spheroidal colloidal silica exhibiting a pH of 10 to 14, and these can be used alone, or can be used by mixing them. In the embodiments, basic spheroidal colloidal silica, acidic colloidal silica, or a mixture of basic colloidal silica and acidic colloidal silica are particularly preferably used as the spheroidal colloidal silica. The spheroidal colloidal silica is preferably used so as to adjust the pH of the above-described elongated colloidal silica mixture to be weakly acidic to weakly alkaline. The antifogging coating composition according to the embodiment comprising the elongated colloidal silica and the spheroidal colloidal silica can form an antifogging coating film in which blushing during drying hardly occurs. Note that the elongated colloidal silica and the spheroidal colloidal silica is preferably mixed such that the solid content weight ratio between the elongated colloidal silica and the spheroidal colloidal silica is 10:10 to 40:10, preferably 15:10 to 30:10, more preferably 20:10 to 25:10. The antifogging coating composition blended at such a ratio is particularly excellent in film-forming properties, and a homogeneous coating film in which no cracking, cissing, or the like is observed on the surface of the coating film can be obtained. Examples of the spheroidal colloidal silica that can be used in the embodiments include commercially available products such as ST-N, ST-NXS, ST-S, ST-XS, ST-O, ST-OXS (all available from Nissan Chemical Corporation). The above-described elongated colloidal silica and spheroidal colloidal silica may be mixed in any combination such that the pH of the antifogging coating composition according to the embodiment is in a range not affecting the substrate to which the antifogging coating composition is applied (usually in a range of weak acidity to weak alkalinity). For example, acidic elongated colloidal silica, basic elongated colloidal silica, and basic spheroidal colloidal silica can be used by mixing them. Other examples of the combination include a combination of basic elongated colloidal silica and acidic spheroidal colloidal silica, a combination of acidic elongated colloidal silica and basic spheroidal colloidal silica, a combination of acidic elongated colloidal silica, basic elongated colloidal silica and acidic spheroidal colloidal silica, a combination of acidic elongated colloidal silica, basic elongated colloidal silica, basic spheroidal colloidal silica and acidic spheroidal colloidal silica, a combination of neutral elongated colloidal silica and acidic spheroidal colloidal silica, a combination of basic elongated colloidal silica and neutral spheroidal colloidal silica, and a combination of basic elongated colloidal silica, acidic spheroidal colloidal silica, and basic spheroidal colloidal silica. In this way, the elongated colloidal silica and the spheroidal colloidal silica can be mixed in any combination.

The antifogging coating composition according to the embodiment may further comprise a surfactant. In the antifogging coating composition according to the embodiment, the surfactant is used to assist the spreading of each colloidal silica onto the surface of the substrate and to facilitate the coating work. As the surfactant, any of an anionic surfactant, a cationic surfactant, a nonionic surfactant, and an amphoteric surfactant can be used, and one, or two or more of these surfactants can be used. Examples of the anionic surfactant include: fatty acid salts such as sodium oleate and potassium oleate; higher alcohol sulfates such as sodium lauryl sulfate and ammonium lauryl sulfate; alkyl benzene sulfonate and alkyl naphthalene sulfonate such as sodium dodecylbenzene sulfonate and sodium alkyl naphthalene sulfonate; naphthalene sulfonate formalin condensates; dialkyl sulfosuccinate salts; dialkyl phosphate salts; polyoxyethylene sulfate salts such as sodium polyoxyethylene alkylphenyl ether sulfate;

and anionic fluorine-based surfactants of the sulfonate salt type containing a perfluoroalkyl group, the carboxylate salt type containing a perfluoroalkyl group, the sulfonate salt type containing a perfluoroalkenyl group, the carboxylate salt type containing a perfluoroalkenyl group, and the like. Examples of the cationic surfactant include: amine salts such as ethanolamines, laurylamine acetate, triethanolamine monoformate, and stearamidoethyldiethylamine acetate; quaternary ammonium salts such as lauryltrimethylammonium chloride, stearyltrimethylammonium chloride, dilauryldimethylammonium chloride, distearyldimethylammonium chloride, lauryldimethylbenzylammonium chloride, and stearyldimethylbenzylammonium chloride; and cationic fluorine-based surfactants of the quaternary ammonium salt type containing a perfluoroalkyl group or a perfluoroalkenyl group, and the like.

Examples of the nonionic surfactant include: polyoxyethylene higher alcohol ethers such as polyoxyethylene lauryl alcohol, polyoxyethylene lauryl ether and polyoxyethylene oleyl ether; polyoxyethylene alkyl aryl ethers such as polyoxyethylene octylphenol and polyoxyethylene nonylphenol polyoxyethylene acyl esters such as polyoxyethylene glycol monostearate; polypropylene glycol ethylene oxide adducts; polyoxyethylene sorbitan fatty acid esters such as polyoxyethylene sorbitan monolaurate and polyoxyethylene sorbitan monostearate; phosphates such as alkyl phosphate and polyoxyethylene alkyl ether phosphate; sugar esters; cellulose ethers; silicones such as polyether-modified silicone oils; and nonionic fluorine-based surfactants of the ethylene oxide adduct type containing a perfluoroalkyl group, the amine oxide type containing a perfluoroalkyl group, the oligomer type containing a perfluoroalkyl group, the ethylene oxide adduct type containing a perfluoroalkenyl group, the amine oxide type containing a perfluoroalkenyl group, and the oligomer type containing a perfluoroalkenyl group, and the like. Examples of the amphoteric surfactant include: quaternary ammonium salts such as lauryltrimethylammonium chloride, dilauryldimethylammonium chloride, distearyldimethylammonium chloride, and lauryldimethylbenzylammonium chloride; fatty acid type amphoteric surfactants such as dimethyl alkyl lauryl betaine and dimethyl alkyl stearyl betaine; sulfonic acid type amphoteric surfactants such as dimethyl alkyl sulfobetaine; alkylglycine; and betaine type amphoteric fluorine-based surfactants containing a perfluoroalkyl group or a perfluoroalkenyl group. As the surfactant according to the present embodiment, any of the surfactants described above can be preferably used. The surfactant is preferably contained in an amount of about 0.01 to 0.30 parts by weight per 100 parts by weight of the antifogging coating composition.

The antifogging coating composition according to the embodiment may further comprise an organic solvent. Even when solely using a colloidal silica mixture containing water as a dispersion medium, which is a main component of the antifogging coating composition according to the embodiment, an antifogging coating film can be formed by applying the colloidal silica mixture onto the surface of the substrate. However, if the organic solvent is further comprised, drying of water during formation of the coating film is facilitated. Therefore, an antifogging coating film can be formed more quickly on the surface of the article. The organic solvent that can be used in the embodiments is an organic solvent that is compatible with water or miscible with water to a predetermined extent. Examples of such an organic solvent include alcohols (methanol, ethanol, propanol, ethylene glycol, and the like), ethers (dimethoxyethane, tetrahydrofuran, dioxane, propylene glycol monomethyl ether, and the like), ketones (acetone, ethyl methyl ketone, and the like), amides (dimethylformamide and the like), dimethyl sulfoxide (DMSO), acetonitrile, nitromethane, and triethylamine. The organic solvent is preferably comprised in an amount of about 10 to 80 parts by weight per 100 parts by weight of the antifogging coating composition.

A preferred antifogging coating composition according to the present embodiment can be produced by first preparing elongated colloidal silica and spheroidal colloidal silica, and then mixing a surfactant and an organic solvent therewith as necessary. The elongated colloidal silica and the spheroidal colloidal silica are dispersed in water as a dispersion medium at a specific solid content ratio, and can be mixed such that the solid content weight ratio between the elongated colloidal silica and the spheroidal colloidal silica is 10:10 to 40:10, preferably 15:10 to 30:10, and more preferably 20:10 to 25:10. When the ratio of the elongated colloidal silica to the spheroidal colloidal silica is too large, blushing is likely to occur in the test of blushing during drying described later, and appearance defects are likely to occur. When the ratio of the elongated colloidal silica to the spheroidal colloidal silica is too small, film formation failure is likely to occur. By blending the elongated colloidal silica and the spheroidal silica in an appropriate ratio, an antifogging coating film composition excellent in film-forming properties can be obtained, whereby an antifogging coating film that is homogeneous and has high antifogging properties can be formed. In addition to these components, additives (e.g., dyes, pigments, plasticizers, dispersants, preservatives, matting agents, antistatic agents, flame retardants) usually comprised in the coating composition can be appropriately blended in the antifogging coating composition according to the embodiment.

The antifogging coating composition according to the embodiment in which the elongated colloidal silica, the spheroidal colloidal silica, and optionally the surfactant and the organic solvent are appropriately blended can be applied to the surface of the substrate. Examples of the substrate include glass, plastic, metal, and the like, but the antifogging coating composition according to the embodiment can be suitably applied onto a transparent plastic in particular. The antifogging coating composition can be appropriately applied to the surface of the substrate by a conventional coating method such as a doctor blade method, a bar coating method, a dipping method, an air spray method, a roller brush method, or a roller coater method. The applied antifogging coating composition can be heated to form an antifogging coating film. The heating of the antifogging coating composition only requires that the antifogging coating composition be heated to a temperature sufficient for water, and an organic solvent, if comprised, to evaporate. Although depending on the type of the organic solvent to be used, water and the organic solvent can be evaporated by heating the antifogging coating composition to usually about 80 to 150° C., preferably about 100 to 150° C. The antifogging coating composition coated product can be heated by a heating method using hot air from a dryer or the like, in addition to heating using a heating device such as a burner or an oven. In this way, when water and an organic solvent is dried by applying the antifogging coating composition according to the embodiment to the substrate and heating the composition, the elongated colloidal silica and the spheroidal colloidal silica spread on the surface of the substrate becomes the elongated silica and the spheroidal silica, respectively, to form a coating film. Thus, by applying the antifogging coating composition according to the embodiment to an article, an antifogging coating film can be formed to obtain an antifogging article.

Another embodiment of the present invention is an antifogging coating film comprising elongated silica and spheroidal silica. In the antifogging coating film according to the embodiment, a void exists between adjacent elongated silicas, and spheroidal silica is embedded in the void. As for the antifogging coating composition according to the embodiment comprising the elongated colloidal silica mixture and the spheroidal colloidal silica, technologically significant points will be described below with reference to the drawings. Note that the structure of the antifogging coating film and the theory about a blushing prevention mechanism are not necessarily limited to the following.

FIG. 1 is a view illustrating a state of an antifogging coating film formed from an antifogging coating composition comprising only elongated colloidal silica (conventional product). In FIG. 1, reference numerals mean as follows: 1: a substrate; 2: elongated silica; 4: a void; and 5: an antifogging coating film (conventional product). In the antifogging coating film 5 of FIG. 1, the elongated silicas 2 each having a long shape (e.g., a tubular shape, a rod shape, or a string shape) are drawn to be disposed in a state in which the length directions thereof are substantially aligned, but in the actual antifogging coating film 5, the elongated silicas 2 are not necessarily disposed regularly. In FIG. 1, the elongated silica 2 having a relatively rigid long structure is disposed on the substrate 1, and the voids 4 exist in some places. The size of the void 4 is usually about several hundred nanometers to several micrometers. When water vapor comes into contact with the antifogging coating film 5 illustrated in FIG. 1, a water film is formed on the antifogging coating film 5, and the water vapor permeates into the voids 4. In the process of drying of water, the water film formed on the surface of the antifogging coating film 5 is quickly dried, but the water having penetrated into the voids 4 is slightly slowly dried. It is considered that light is scattered and dispersedly reflected at the part in which water remains, and blushing occurs in the antifogging coating film.

Figure 2:
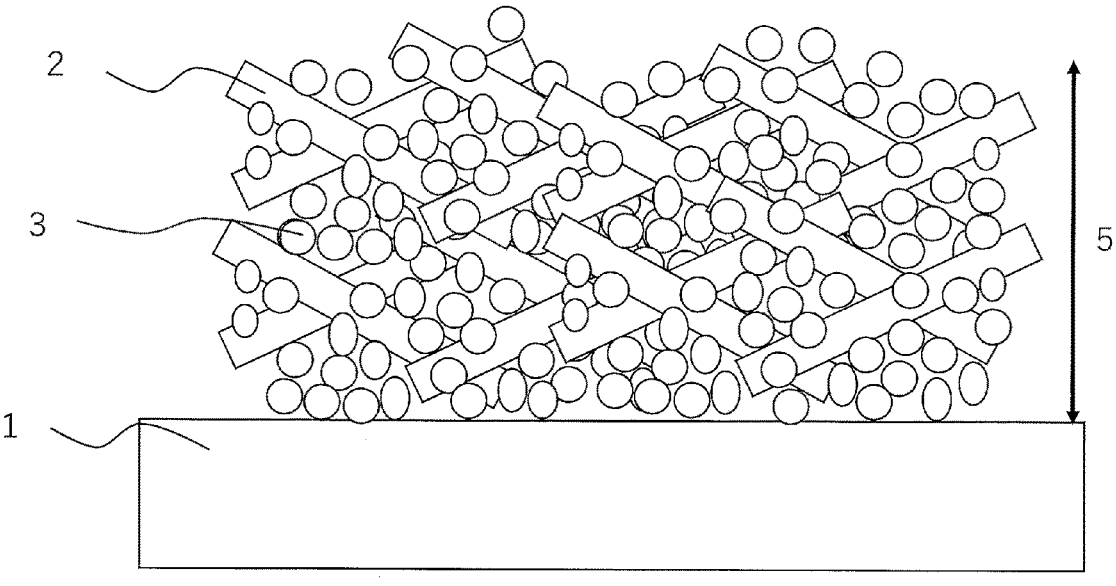
FIG. 2 is a schematic view illustrating a state in which an antifogging coating film according to an embodiment in which spheroidal silica is embedded in a void between the adjacent elongated silicas is formed on a surface of the substrate.

FIG. 2 is a view illustrating a state of an antifogging coating film formed from the antifogging coating composition (the embodiment of the present invention) comprising elongated colloidal silica and spheroidal colloidal silica. In FIG. 2, reference numerals mean as follows: 1: a substrate; 2: elongated silica; 3: spheroidal silica; and 5: an antifogging coating film. In the antifogging coating film 5 of FIG. 2, the elongated silicas 2 each having a long shape (e.g., a tubular shape, a rod shape, or a string shape) are drawn to be disposed in a state in which the length directions thereof are substantially aligned, but in the actual antifogging coating film 5, the elongated silicas 2 are not necessarily disposed regularly. In FIG. 2, the elongated silica 2 having a relatively rigid long structure is disposed on the substrate 1, and the spheroidal silica 3 smaller than the size of a void (this void usually has a size of about several hundred nanometers to several micrometers; i.e., the size of the spheroidal silica 3 is several nanometers to several tens of nanometers) is embedded in the void which may be present in some places between the adjacent elongated silicas. Although the spheroidal silicas 3 are not disposed so as to completely fill the voids, it is considered that the spheroidal silicas 3 are disposed so as to substantially eliminate the voids as illustrated in FIG. 2. When water vapor comes into contact with the antifogging coating film 5 shown in FIG. 2, a water film is formed on the antifogging coating film 5, but since the antifogging coating film 5 of FIG. 2 has no voids or extremely small voids if any, water vapor hardly permeates into the antifogging coating film 5. In the process of drying of water, the water film formed on the surface of the antifogging coating film 5 is quickly dried, and there is almost no water that has permeated into the antifogging coating film. Such water may cause diffuse reflection of light. Therefore, it is considered from the above that blushing is not observed.

Figure 3:
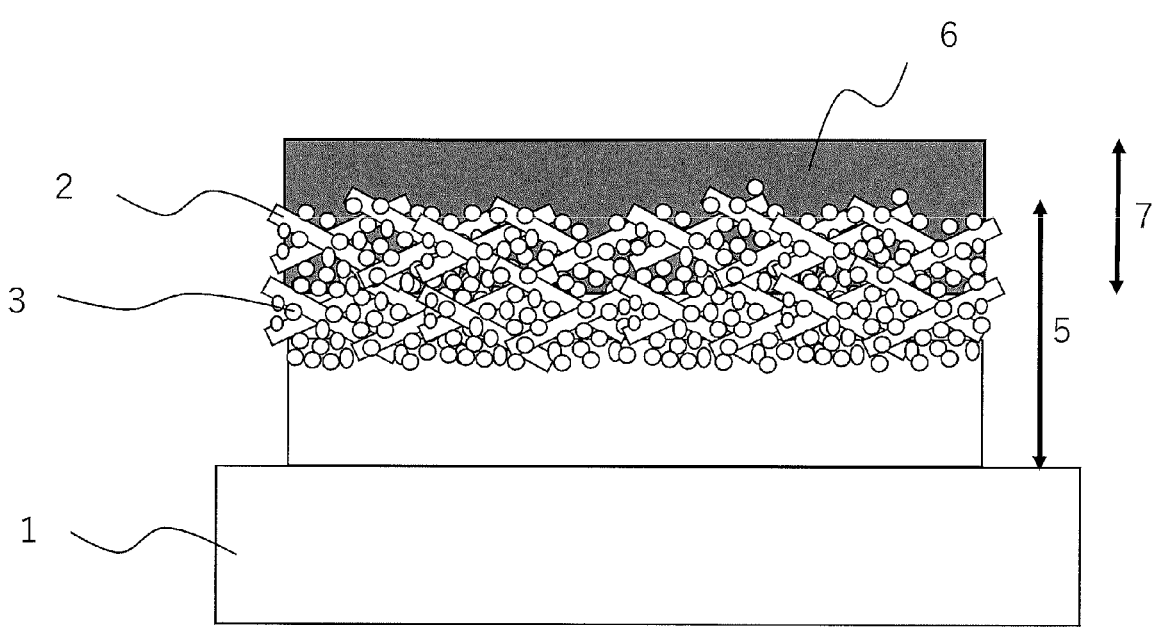
FIG. 3 is a schematic view illustrating a state in which water covers the antifogging coating film according to the embodiment and a water film is formed.

FIG. 3 is a view illustrating a state in which water vapor comes into contact with the antifogging coating film formed from the antifogging coating composition (the embodiment of the present invention) comprising elongated colloidal silica and spheroidal colloidal silica, which is the embodiment of the present invention, whereby a water film is formed on the surface of the antifogging coating film. In FIG. 3, reference numerals mean as follows: 1: a substrate; 2: elongated silica; 3: spheroidal silica; 5: an antifogging coating film; 6: water; and 7: a range in which water can permeate. In the antifogging coating film 5 of FIG. 3, the state in which the elongated silica 2 and the spheroidal silica 3 are disposed is drawn only in the upper portion of the antifogging coating film 5, and this drawing is not made in the lower portion. However, the elongated silica 2 and the spheroidal silica 3 are also disposed in the lower portion similarly to the upper portion. When water vapor comes into contact with the antifogging coating film 5 illustrated in FIG. 3, a water film (water 6) is formed on the antifogging coating film 5. Since the antifogging coating film 5 in FIG. 3 has no voids or extremely small voids if any, water vapor hardly permeates into the antifogging coating film 5. Therefore, the range in which water permeates in the antifogging coating film 5 is only the range of the arrow denoted by 7 at the maximum, and water does not reach the deep portion of the antifogging coating film 5. Thereafter, in the process of drying of water, the water film (water 6) formed on the surface of the antifogging coating film 5 is quickly dried, and there is almost no water permeating into the antifogging coating film 5. Such water may cause scattering of light. Therefore, it is considered from the above that blushing is not observed in the antifogging coating film 5.

As described above, in the antifogging coating film according to the embodiment, the spheroidal silica is embedded in the void formed by the adjacent elongated silicas. Therefore, even if the antifogging coating film comes into contact with water vapor, water hardly permeates into the antifogging coating film. The water film formed on the surface of the antifogging coating film is immediately dried, and water hardly remains inside the antifogging coating film. Therefore, diffuse reflection due to scattering of light can be prevented. For this reason, blushing hardly occurs in the antifogging coating film according to the embodiment. In the antifogging coating film according to the embodiment, the disposed elongated silica comprises acidic elongated silica and basic elongated silica, and the spheroidal silica embedded in the void between adjacent elongated silicas may comprise basic spheroidal silica, acidic spheroidal silica, or a mixture of basic spheroidal silica and acidic spheroidal silica. In this embodiment, the acidic elongated silica is elongated silica that exhibits acidity when dispersed in water. Further, the basic elongated silica is elongated silica that exhibits basicity when dispersed in water. Furthermore, the basic spheroidal silica is spheroidal silica that exhibits basicity when dispersed in water. Still furthermore, the acidic spheroidal silica is spheroidal silica that exhibits acidity when dispersed in water.

An antifogging coating film can be formed by applying the antifogging coating composition according to the present embodiment to a substrate. In addition, an antifogging article having the antifogging coating film according to the embodiment on the substrate can be obtained. Examples of the antifogging article according to the embodiment include an illumination device, a headlight, a window, a lens, a lens cover, a monitor, and a monitor cover. The antifogging article according to the embodiment has excellent antifogging performance and does not cause changes in appearance, such as formation of a trace of water trickling down. Even when water vapor comes into contact with the antifogging article according to the embodiment, blushing does not occur, or hardly occurs.

EXAMPLES (1) Preparation of Antifogging Coating Composition

An antifogging coating composition (Example 1) was prepared by mixing 48.93 parts by weight of acidic elongated colloidal silica (ST-OUP [solid content: 15%, aqueous dispersion], Nissan Chemical Corporation), 12.23 parts by weight of basic elongated colloidal silica (ST-UP [solid content: 20%, aqueous dispersion], Nissan Chemical Corporation), 10.49 parts by weight of basic spheroidal colloidal silica (ST-N [solid content: 20%, aqueous dispersion], Nissan Chemical Corporation), 13.98 parts by weight of basic spheroidal colloidal silica (ST-NXS [solid content: 15%, aqueous dispersion], Nissan Chemical Corporation), 0.03 parts by weight of a surfactant (FTERGENT 150, fluorine-based anionic surfactant, NEOS COMPANY LIMITED), and 14.34 parts by weight of an organic solvent (propylene glycol monomethyl ether, NIPPON NYUKAZAI CO., LTD.). Antifogging coating compositions of Examples 2 to 8 were prepared by variously changing the blending ratios of acidic elongated colloidal silica, basic elongated colloidal silica, two types of basic spheroidal colloidal silica ST-N and ST-NXS, two types of acidic spheroidal colloidal silica ST-O and ST-OXS, a surfactant, and an organic solvent. Similarly, antifogging coating compositions of Comparative Examples 1 and 2 were prepared. The constituent configuration of each antifogging coating composition are given in Tables 1 and 2. [Table 1]

TABLE 1

Blending of antifogging coating composition and evaluation of antifogging coating film (Examples)

| | | | Examples | | | | | | | |
| --- | --- | --- | --- | --- | --- | --- | --- | --- | --- | --- |
| | | | 1 | 2 | 3 | 4 | 5 | 6 | 7 | 8 |
| Elongated silica/spheroidal silica (solid content weight ratio) | | | 7/3 (23.3/10) | 7/3 (23.3/10) | 7/3 (23.3/10) | 6/4 (15/10) | 7/3 (23.3/10) | 7/3 (23.3/10) | 8/2 (40/10) | 5/5 (10/10) |
| Antifogging coating composition (parts by | Elongated colloidal silica | ST-OUP | 48.93 | 51.08 | 46.96 | 44.76 | 45.15 | 51.08 | 57.12 | 38.15 |
| | | ST-UP | 12.23 | 12.77 | 11.74 | 11.19 | 11.29 | 12.77 | 14.28 | 9.54 |
| | Basic | ST-N | 10.49 | 21.89 | | 29.84 | | 10.94 | 14.28 | 38.15 |

TABLE 1-continued

Blending of antifogging coating composition and evaluation of antifogging coating film (Examples)

| | | | Examples | | | | | | | |
| | | | 1 | 2 | 3 | 4 | 5 | 6 | 7 | 8 |
|---|---|---|---|---|---|---|---|---|---|---|
| weight) | spheroidal colloidal silica | ST-NXS | 13.98 | | 26.84 | | | | | |
| | Acidic | ST-O | | | | | 9.67 | 10.94 | | |
| | spheroidal colloidal silica | ST-OXS | | | | | 19.35 | | | |
| | Surfactant | FT-150 | 0.03 | 0.04 | 0.03 | 0.04 | 0.03 | 0.04 | 0.04 | 0.04 |
| | Solvent | PGM | 14.34 | 14.22 | 14.43 | 14.17 | 14.51 | 14.23 | 14.28 | 14.12 |
| | Total | | 100 | 100 | 100 | 100 | 100 | 100 | 100 | 100 |
| Evaluation | Film-forming properties | | Good | Good | Good | Good | Good | Good | Good | Not acceptable |
| | Antifogging properties | | Not fogged | Not fogged | Not fogged | Not fogged | Not fogged | Not fogged | Not fogged | Not fogged |
| | Trace of water trickling down | | Not trickled | Not trickled | Not trickled | Not trickled | Not trickled | Not trickled | Not trickled | Not trickled |
| | Blushing during drying | | No blushing | No blushing | No blushing | No blushing | No blushing | No blushing | Slight blushing | No blushing |

[Table 2]

TABLE 2

Blending of antifogging coating composition and evaluation of antifogging coating film (Comparative Example)

| | | | Comparative Example 1 |
|---|---|---|---|
| | Elongated silica/spheroidal silica solid content weight ratio | | 10/0 |
| Antifogging coating composition (parts by weight) | Elongated colloidal silica | ST-OUP | 68.47 |
| | | ST-UP | 17.12 |
| | Basic spheroidal colloidal silica | ST-N | |
| | | ST-NXS | |
| | Acidic spheroidal colloidal silica | ST-O | |
| | | ST-OXS | |
| | Surfactant | FT-150 | 0.03 |
| | Solvent | PGM | 14.38 |
| | Total | | 100 |
| Evaluation | Film-forming properties | | Good |
| | Antifogging properties | | Not fogged |
| | Trace of water trickling down | | Not trickled |
| | Blushing during drying | | No blushing |

The meanings of the abbreviations in tables are as follows:

ST-OUP: Trade name of aqueous dispersion of acidic silica (elongated) having an average primary particle diameter of 12 nm obtained by using the BET method and the solid content of 15%, available from Nissan Chemical Corporation ST-UP: Trade name of aqueous dispersion of basic silica (elongated) having an average primary particle diameter of 12 nm obtained by using the BET method and the solid content of 20%, available from Nissan Chemical Corporation ST-N: Trade name of aqueous dispersion of basic silica (spheroidal) having an average primary particle diameter of 12 nm obtained by using the BET method, the solid content of 20%, available from Nissan Chemical Corporation ST-NXS: Trade name of aqueous dispersion of basic silica (spheroidal) having an average primary particle diameter of 5 nm obtained by using the Sears method and the solid content of 15%, available from Nissan Chemical Corporation ST-O: Trade name of aqueous dispersion of acidic silica (spheroidal) having an average primary particle diameter of 12 nm obtained by using the BET method and solid content of 20%, available from Nissan Chemical Corporation ST-OXS: Trade name of aqueous dispersion of acidic silica (spheroidal) having an average primary particle diameter of 5 nm obtained by using the Sears method and solid content of 10%, available from Nissan Chemical Corporation FT-150: Trade name of an anionic surfactant, available from NEOS COMPANY LIMITED PGM: Propylene glycol monomethyl ether In the tables, "Elongated silica/spheroidal silica (solid content weight ratio)" is a value obtained by comparing only the weight, in terms of solid content, of the elongated colloidal silica (mixture) and the spheroidal colloidal silica (mixture) (i.e., the weight of the mixture of the elongated silica and the mixture of the spheroidal silica) used in the coating compositions and calculating the ratio thereof. For example, the antifogging coating composition of Example 1 contains 7.34 parts by weight of the acidic elongated colloidal silica ST-OUP in terms of solid content, 2.45 parts by weight of the basic elongated colloidal silica ST-UP in terms of solid content, 2.10 parts by weight of the basic spheroidal colloidal silica ST-N in terms of solid content, and 2.10 parts by weight of the basic spheroidal colloidal silica ST-NXS in terms of solid content; thus, the solid content weight ratio of the elongated silica mixture to the spheroidal silica mixture is 7/3 (23.3/10). For other examples and comparative examples, the value of "Elongated silica/spheroidal silica (solid content weight ratio)" was calculated in the same manner.

(2) Preparation of Antifogging Coating Film

Each antifogging coating composition was applied onto a polycarbonate resin plate substrate. Application was performed by using a bar coating method, and the thickness of the antifogging coating film after formation of the antifogging coating composition was adjusted to 1 μm. The substrates coated with the antifogging coating composition were each placed in an oven at 110° C. for 15 minutes to evaporate water and the organic solvent, thereby forming an antifogging coating film. In this way, each antifogging coating film test piece was obtained.

(3) Evaluation of Film-Forming Properties of Antifogging Coating Film Composition The surfaces of the antifogging coating film test pieces were visually observed. A case where a homogeneous coating film was obtained is described as "good", a case where a homogeneous coating film in which cracking, cissing or the like was slightly observed was obtained is described as "acceptable", and a case where cracking, cissing or the like were observed in many places on the surface and a homogeneous coating film was not obtained is described as "not acceptable".

(4) Evaluation of Antifogging Properties of Antifogging Coating Film

Antifogging coating film test pieces were each disposed at a position 1 cm above the water surface of a hot water bath at 60° C. such that the coating film faced downward, and steam from the hot water bath was applied to the coating film. After a lapse of one minute, whether or not fog was formed on the coating film was visually observed. A coating film having no fog on its surface is described as "not fogged", and a coating film having fog on its surface is described as "fogged".

(5) Evaluation of Change in Appearance of Antifogging Coating Film

After the evaluation of the antifogging properties of the coating film was performed, the antifogging coating film test pieces were each maintained for 30 minutes while being vertically leaned and dried. Thereafter, whether a trace of water trickling down was formed on the antifogging coating film test pieces was visually observed. A case where no trace of water trickling down was observed is described as "not trickled", a case where a trace of water trickling down was observed is described as "slightly trickled", and a case where a trace of water trickling down was clearly observed is described as "trickled".

(6) Evaluation of Blushing During Drying of Antifogging Coating Film

Exhalation was blown from a distance within 3 centimeters from the surface of each antifogging coating film, and the change in appearance of the antifogging coating film was visually observed. Water vapor contained in the exhalation covers the antifogging coating film at the moment when the breath is blown to the surface of the antifogging coating film. In the process of drying thereof, whether the antifogging coating film looks white was observed. A case where no blushing was observed in the process of drying of the antifogging coating film is described as "no blushing", a case where blushing was observed though it was very slight in degree is described as "slight blushing", and a case where blushing was clearly observed is described as "blushing".

All of the antifogging coating compositions of Examples 1 to 4 in which acidic elongated colloidal silica, basic elongated colloidal silica, and basic spheroidal colloidal silica were blended could form an antifogging coating film without cracking, cissing, or the like. The antifogging coating films formed in these examples had excellent antifogging properties. In addition, even when water was brought into contact with the antifogging coating film, a trace of water trickling down was not generated, and a phenomenon of blushing in the process of drying of the antifogging coating film after blowing exhalation thereto was not observed.

Meanwhile, the antifogging coating compositions of Examples 5 and 6 in which acidic elongated colloidal silica, basic elongated colloidal silica, and acidic spheroidal colloidal silica were blended could also form an antifogging coating film without cracking, cissing, or the like. The antifogging coating films formed in these examples had excellent antifogging properties. In addition, even when water was brought into contact with the antifogging coating film, a trace of water trickling down was not generated, and a phenomenon of blushing in the process of drying of the antifogging coating film after blowing exhalation thereto was not observed.

The antifogging coating composition of Example 7 is an antifogging coating composition in which acidic elongated colloidal silica, basic elongated colloidal silica, and basic spheroidal colloidal silica were blended such that the solid content weight ratio between the elongated silica and the spheroidal silica is 40:10. The antifogging coating composition of the present example could form an antifogging coating film without cracking, cissing, or the like. In addition, even when water was brought into contact with the antifogging coating film, a trace of water trickling down was not generated. When the antifogging coating film of the present example was dried after blowing exhalation thereto, blushing was observed though it was slight in degree.

The antifogging coating composition of Example 8 is an antifogging coating composition in which acidic elongated colloidal silica, basic elongated colloidal silica, and basic spheroidal colloidal silica were blended such that the solid content weight ratio between the elongated silica and the spheroidal silica is 10:10. The antifogging coating film formed from the antifogging coating composition of the present example had antifogging properties, and a phenomenon of blushing was not observed in the process of drying of the antifogging coating film after blowing exhalation thereto. However, the antifogging coating composition of the present example had slight difficulty in film-forming properties, and when water was brought into contact with the antifogging coating film, a trace of water trickling down was slightly observed.

It can be seen from the results of these examples that the antifogging coating film obtained from the antifogging coating composition comprising the elongated colloidal silica and the spheroidal colloidal silica has high antifogging properties, and blushing during drying of the antifogging coating film is hardly observed. By appropriately changing the solid content weight ratio between the elongated colloidal silica and the spheroidal colloidal silica, it is possible to improve the film-forming properties of the antifogging coating composition and to prevent the formation of a trace of water trickling down of the resulting antifogging coating film.

The coating film formed from the antifogging coating composition of Comparative Example 1 in which only the elongated colloidal silica was blended and the spheroidal colloidal silica was not contained was excellent in all of the film-forming properties, antifogging properties, and the evaluation in an appearance change test of the coating film. However, obvious blushing was observed in the drying process after blowing of exhalation. In the coating film formed from the antifogging coating composition of Comparative Example 2 in which the elongated colloidal silica was not contained and only the spheroidal colloidal silica was blended, cracking occurred on the surface of the coating film, and the effective coating film was not formed. Therefore, the antifogging properties, a trace of water trickling down, and characteristics with regard to blushing during drying of the coating film were not evaluated.

REFERENCE SIGNS LIST

1 Substrate
2 Elongated silica
3 Spheroidal silica
4 Void
5 Antifogging coating film
6 Water
7 Range in which water can permeate

The invention claimed is:

1. An antifogging coating composition comprising:
elongated colloidal silica comprising a mixture of acidic elongated colloidal silica and basic elongated colloidal silica; and
spheroidal colloidal silica,
wherein a solid content weight ratio between the elongated colloidal silica and the spheroidal colloidal silica is 15:10 to 25:10.

2. The antifogging coating composition according to claim 1,
wherein the spheroidal colloidal silica is basic spheroidal colloidal silica, acidic spheroidal colloidal silica, or a mixture of the basic spheroidal colloidal silica and the acidic spheroidal colloidal silica.

3. The antifogging coating composition according to claim 1, further comprising a surfactant.

4. The antifogging coating composition according to claim 1, further comprising an organic solvent.

5. The antifogging coating composition according to claim 2, further comprising a surfactant.

6. The antifogging coating composition according to claim 2, further comprising an organic solvent.

7. The antifogging coating composition according to claim 3, further comprising an organic solvent.

8. The antifogging coating composition according to claim 5, further comprising an organic solvent.

9. An antifogging coating film comprising:
elongated silica comprising a mixture of acidic elongated colloidal silica and basic elongated colloidal silica; and
spheroidal silica,
wherein a solid content weight ratio between the elongated colloidal silica and the spheroidal colloidal silica is 15:10 to 25:10, and
wherein the spheroidal silica is embedded in a void between adjacent ones of the elongated silica.

10. The antifogging coating film according to claim 9,
wherein the spheroidal silica comprises basic spheroidal silica, acidic spheroidal silica, or a mixture of the basic spheroidal silica and the acidic spheroidal silica.

11. An antifogging article comprising:
a substrate; and
the antifogging coating film according to claim 9.

* * * * *